United States Patent
Books et al.

(10) Patent No.: US 9,821,663 B2
(45) Date of Patent: Nov. 21, 2017

(54) SYSTEMS AND METHODS FOR BATTERY REGENERATION BASED ON ENGINE LOADING

(71) Applicant: Cummins Inc., Columbus, IN (US)

(72) Inventors: Martin T. Books, Columbus, IN (US); Vivek A. Sujan, Columbus, IN (US); Praveen C. Muralidhar, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 35 days.

(21) Appl. No.: 14/518,582

(22) Filed: Oct. 20, 2014

(65) Prior Publication Data

US 2016/0111990 A1    Apr. 21, 2016

(51) Int. Cl.
| H02P 9/00 | (2006.01) |
| F02N 11/08 | (2006.01) |
| H02P 9/48 | (2006.01) |
| B60L 11/02 | (2006.01) |
| F02N 11/04 | (2006.01) |
| H02J 7/14 | (2006.01) |

(52) U.S. Cl.
CPC .............. *B60L 11/02* (2013.01); *F02N 11/04* (2013.01); *F02N 11/0814* (2013.01); *F02N 2200/06* (2013.01); *F02N 2200/061* (2013.01); *H02J 7/14* (2013.01)

(58) Field of Classification Search
CPC ........ H02P 9/008; H02P 9/48; F02N 11/0862; F02N 11/0814; F02N 11/04; B60L 11/02; H02J 7/14
See application file for complete search history.

(56) References Cited

U.S. PATENT DOCUMENTS

| 5,038,728 A | 8/1991 | Yoshida et al. |
| 5,080,059 A | 1/1992 | Yoshida et al. |
| 5,512,813 A * | 4/1996 | Uchinami ............. H02J 7/1446 320/163 |
| 5,631,544 A | 5/1997 | Syverson et al. |
| 5,867,384 A | 2/1999 | Drees et al. |
| 6,452,286 B1 * | 9/2002 | Kubo ..................... B60K 6/485 180/65.26 |
| 7,019,414 B2 | 3/2006 | Albertson et al. |

(Continued)

FOREIGN PATENT DOCUMENTS

JP    WO 2013088523 A1 *    6/2013    ............... B60K 6/46

OTHER PUBLICATIONS

International Search Report and Written Opinion, International Application No. PCT/US2015/056173, ISA/US, 10 pages, dated Jan. 6, 2016.

*Primary Examiner* — Viet Nguyen
(74) *Attorney, Agent, or Firm* — Taft Stettinius & Hollister LLP (57) ABSTRACT

An alternator voltage may be controlled based on a proportional gain scheduling in response to an engine load of an internal combustion engine and/or a state of charge (SOC) deviation for a battery based on a target SOC of the battery and an actual SOC of the battery. The alternator voltage may be a voltage less than a current battery voltage under high engine loads to enable the battery to power an accessory system and the alternator voltage may be a voltage greater than a voltage of the battery under low engine loads or engine loads less than high engine loads to enable the alternator to charge the battery.

17 Claims, 5 Drawing Sheets

(56) References Cited

U.S. PATENT DOCUMENTS

| | | |
|---|---|---|
| 7,245,038 B2 | 7/2007 | Albertson et al. |
| 7,812,467 B1 | 10/2010 | Lemancik et al. |
| 2002/0130519 A1* | 9/2002 | Nakajima .............. B60K 6/46 290/40 C |
| 2006/0276937 A1* | 12/2006 | Yamashita ............ H02J 7/1446 700/291 |
| 2007/0272186 A1* | 11/2007 | Fukushima ........... B60W 10/06 123/179.3 |
| 2009/0243385 A1* | 10/2009 | Ichikawa .............. B60L 11/123 307/9.1 |
| 2012/0104767 A1 | 5/2012 | Gibson et al. |
| 2012/0130597 A1* | 5/2012 | Aoyagi ................. B60W 10/06 701/48 |
| 2012/0208672 A1* | 8/2012 | Sujan ................... B60W 10/02 477/5 |
| 2013/0193892 A1* | 8/2013 | Ishihara ................ B60W 10/06 318/454 |
| 2013/0218408 A1 | 8/2013 | Yu et al. |
| 2014/0102187 A1 | 4/2014 | Andreae |
| 2014/0125264 A1* | 5/2014 | Nakamura ................ H02P 6/10 318/400.23 |
| 2014/0159622 A1* | 6/2014 | Morii ...................... H02P 6/142 318/400.3 |
| 2014/0232112 A1* | 8/2014 | Wada ....................... B60K 6/46 290/17 |
| 2015/0246685 A1* | 9/2015 | Dixon .................... B62D 5/046 701/42 |

\* cited by examiner

SYSTEMS AND METHODS FOR BATTERY REGENERATION BASED ON ENGINE LOADING

BACKGROUND

The present application generally relates to managing battery regeneration, and in particular relates to managing battery regeneration of a vehicle including a hybrid or start-stop system for an internal combustion engine. In hybrid or start-stop systems, engine efficiency may be impacted in various ways, which may result in efficiency and/or optimization issues. Therefore, a need remains for further improvements in systems and methods in this area.

SUMMARY

One embodiment is a unique system and method for managing battery regeneration based on an output voltage of an alternator in hybrid or start-stop system of a vehicle under certain engine loads. Other embodiments include apparatuses, systems, devices, hardware, methods, and combinations for managing battery regeneration through regulating voltage of an alternator of a hybrid or start-stop vehicle. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
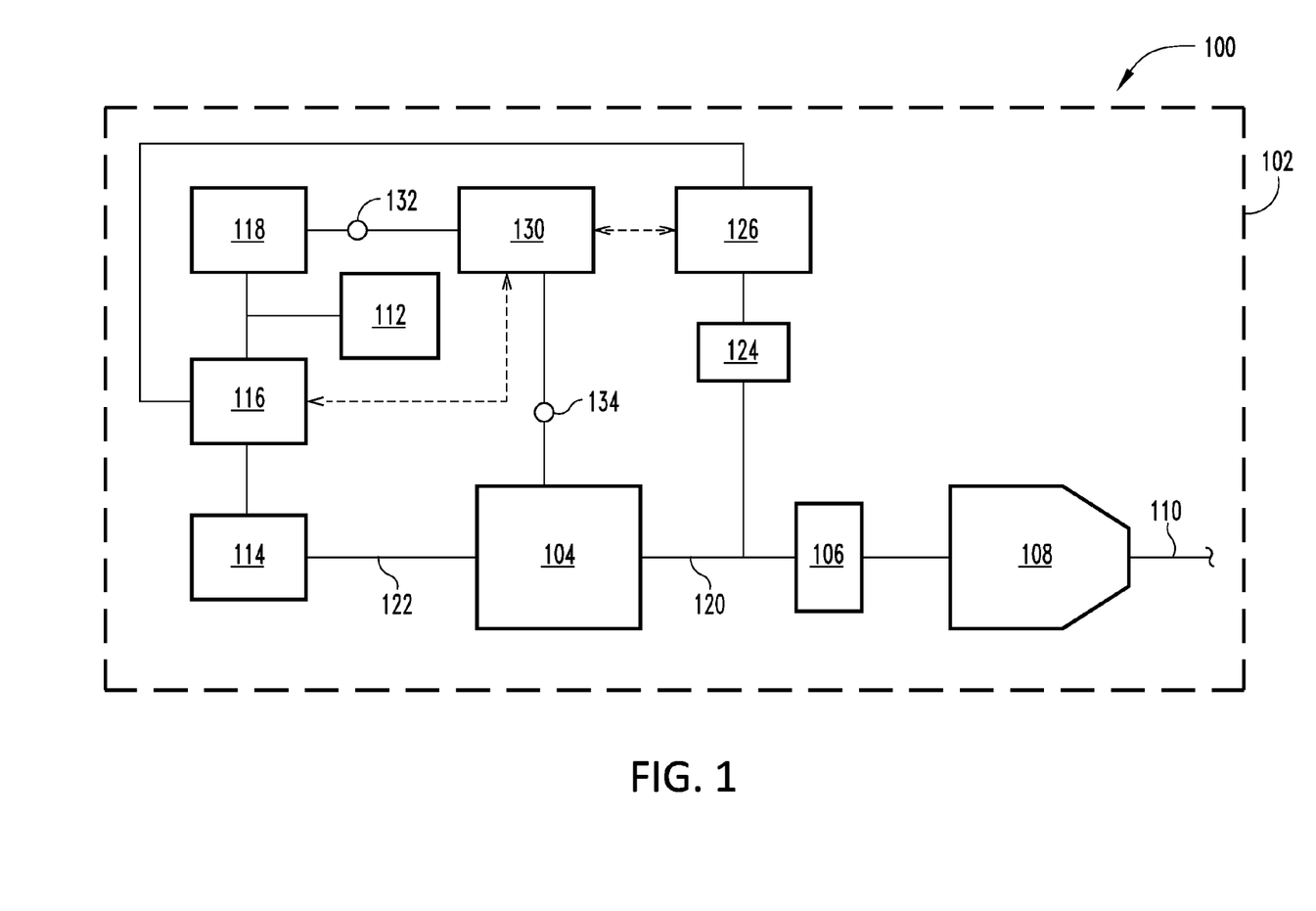
FIG. 1 is a block diagram of an example vehicle system including an engine and an alternator.

With reference to FIG. 1, there is illustrated an example system 100 that includes a vehicle 102, such as a hybrid or start/stop vehicle, with a powertrain including an engine 104, such as an internal combustion engine with an intake and an exhaust system. The engine 104 may be any type of internal combustion engine known in the art. In some applications, the internal combustion engine 104 may be a diesel engine, although gasoline engines and engines that operate with any type of fuel are contemplated.

The powertrain further includes an output shaft 120 mechanically coupling the engine 104 with a clutch 106, or torque converter, and a transmission 108. The clutch 106 may be a slip clutch, an on-off type clutch, or any type of mechanical or hydraulic device capable of coupling and decoupling the engine 104 and the transmission 108. The transmission 108 mechanically couples the output shaft 120 to a drive shaft 110 to deliver drive torque to one or more drive wheels (not shown) in response to an operator torque demand, for example. In certain embodiments, the transmission 108 may include a gear box and a manual clutch (not shown) that drivingly engages the output shaft 120 extending from the engine 104 and the clutch 106, such as in an automated manual transmission (AMT) arrangement, for example, although other suitable coupling arrangements capable of providing drive torque to the drive wheels are contemplated herein.

The system 100 further includes a starter 126 selectively coupled to the output shaft 120 through a gearbox 124. The starter 126 generally includes a starter motor that is operable to provide a starting torque to the output shaft 120 to rotate the output shaft 120 and, as a result, the engine 104 to a sufficient speed so that fueling of the engine 104 can initiate combustion and starting of the engine 104. In certain embodiments, the clutch 106 is selectively engageable to transmit drive torque produced by the starter 126 to the engine 104.

In certain other embodiments, the starter 126 may be an electric motor/generator device. In such embodiments, the electric motor/generator device may be an asynchronous motor generator, an induction motor, a synchronous motor/generator or any type of motor capable of providing additional torque to rotate output shaft 120. In other such electric motor/generator device embodiments, the electric motor/generator device may be electrically connected with a high voltage electrical energy storage device (e.g., a lithium ion battery, a lead-acid battery, a nickel metal hydride battery, or any other device capable of storing electrical energy) to store the high voltage electricity generated by the electric motor/generator device. In certain embodiments, energy may be stored non-electrically, for example in a high performance fly wheel, in a compressed air tank, and/or through deflection of a high capacity spring. Where the energy is stored electrically, any high voltage electrical energy storage device known in the art is contemplated, including a hyper-capacitor and/or an ultra-capacitor.

The powertrain additionally includes an alternator 114 driven by a crankshaft 122 of the engine 104. In certain embodiments, the alternator 114 may be operably coupled to the crankshaft 122 via a belt pulley system (not shown), though any coupling configuration for operably coupling the alternator 114 and the engine 104 known in the art is contemplated herein. The alternator 114 may be electrically connected to an energy storage device 118 and an accessory drive system 112 through a DC-DC converter 116. In certain embodiments, the DC-DC converter 116 may be connected to the alternator 114 and/or the starter 126 to convert the voltage produced by the alternator 114 and/or the starter 126 to an appropriate voltage.

The alternator 114 may be used to charge the energy storage device 118 under certain load conditions and/or used to run low voltage accessories of the system 100, such as the accessory drive system 112. In certain embodiments, the accessory drive system 112 may be powered by the energy storage device 118 when the engine 104 is off. The accessory drive system 112 may include an air compressor, an engine coolant pump, an oil pump, a power steering element, an HVAC element, a cooling fan, a transmission fluid pump, an air pump, various pulleys, and/or other accessories commonly included in an automotive accessory drive system.

In certain embodiments, the energy storage device 118 may be a low voltage energy storage device electrically connected to low voltage electric loads, such as the starter 126 and the accessory drive system 112. In different embodiments, the voltage of the energy storage device 118 may be different. For example, in one embodiment, the voltage can be at or about 12 volts. In another example embodiment, the voltage of the energy storage device 118 can be at or about 24 volts. In still another example embodiment, the voltage of the energy storage device 118 can be at or about 48 volts. It is contemplated that the energy storage device may be arranged in a single energy storage device arrangement or a multiple energy storage device arrangement. In certain starting conditions, the energy storage device 118 may provide power to the starter 126 to initiate the starting of engine 104. Although not illustrated, power electronics and other electrical components can be provided to establish electrical connections between the energy storage device 118, the alternator 114, the starter 126, and/or other low voltage loads, such as the accessory drive system 112.

The system 100 additionally includes a controller 130 that is structured to receive and interpret signals (i.e., inputs) from various sensors positioned throughout the system 100 indicating conditions of at least a portion of the system 100 for determining a voltage command for the alternator 114. In certain embodiments, the controller 130 may be further structured to receive and interpret signals from an engine control unit (ECU), which is directed to regulating and controlling the operation of the engine 104, and/or a transmission control unit (TCU), which is directed to regulating and controlling the operation of the transmission 108. It is contemplated that in certain embodiments, at least a portion of the controller 130 may be integrated within the ECU and/or the TCU.

It is further contemplated that in certain embodiments the ECU, the TCU, and/or the controller 130 may transmit data communication messages across a controller area network (CAN) bus. The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. It is contemplated that in certain embodiments an alternative vehicle bus protocol may be used, such as a vehicle area network (VAN) or one of the Society of Automotive Engineers (SAE) vehicle bus protocols, for example.

The system 100 further includes a state of function/condition ($SO_x$) sensor 132 and an engine speed sensor 134, each in electrical communication with the controller 130. The $SO_x$ sensor 132 is operable to provide a voltage or a current measurement signal that may be used to determine an estimated state of charge (SOC) of the energy storage device 118. In certain embodiments, the $SO_x$ sensor 132 measurement signal may be further used to provide an estimated power, energy, performance capability, state of voltage (SOV) and/or state of health (SOH) of the energy storage device 118. In certain embodiments, the system 100 may include additional and/or alternative sensors operable to monitor and indicate conditions of the energy storage device 118 for determining internal states of the energy storage device 118, which may be used for estimating the SOC, SOV, SOH, power, energy, and/or the like.

The engine speed sensor 134 is operable to sense instantaneous rotational speed of the engine 104 and produce an engine speed signal indicative of engine rotational speed. In one embodiment, the engine speed sensor 134 may be a Hall effect sensor operable to determine engine speed by sensing passage thereby of a number of equi-angularly spaced teeth formed on a gear or tone wheel. Alternatively, the engine speed sensor 134 may be any other known sensor operable to determine engine speed including, but not limited to, a variable reluctance sensor or the like. In certain embodiments, system 100 includes an engine position sensor (not shown) that detects a current position of the crankshaft 120.

The controller 130 includes stored data values, constants, and functions, as well as operating instructions stored on a non-transient computer readable medium. Any of the operations of example procedures described herein may be performed at least partially by the controller 130. In certain embodiments, the controller 130 includes one or more modules structured to functionally execute the operations of the controller 130. The description herein including modules emphasizes the structural independence of the aspects of the controller 130, and illustrates one grouping of operations and responsibilities of the controller 130. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. More specific descriptions of certain embodiments of the controller 130 and operations processed therein are included in the sections referencing FIGS. 2-4. Operations illustrated are understood to be exemplary only, and operations may be combined or divided, and added or removed, as well as re-ordered in whole or in part.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
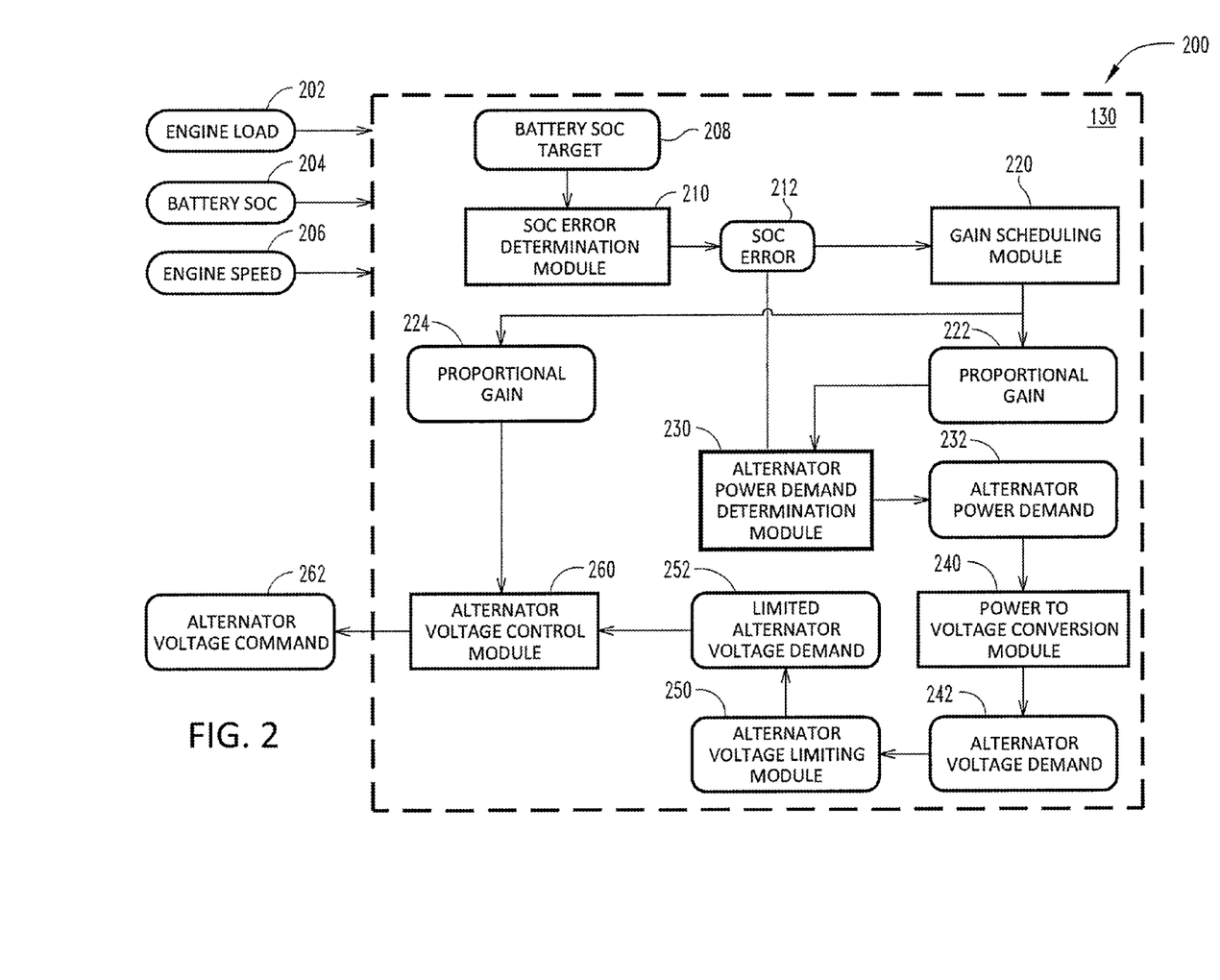
FIG. 2 is a block diagram of an example controller for providing an alternator voltage command to the alternator of FIG. 1.

With reference to FIG. 2, there is illustrated an embodiment 200 of the controller 130 for determining a voltage command for an alternator, such as the alternator 114 referenced in FIG. 1. The controller 130 may be structured to receive and interpret an engine load input 202, a battery SOC input 204 (i.e., a current measured voltage of a battery, such as the energy storage device 118), and an engine speed input 206. In certain embodiments, the engine load input 202 may be a net torque, such as a net brake torque (i.e., the torque at the main engine output shaft), an engine horsepower output, and/or any value understood in the art as an engine load. In certain embodiments, the engine speed input 206 may be determined from the engine speed sensor 134 described in FIG. 1. In certain embodiments, the controller 130 may be further structured to receive and interpret additional and/or alternative inputs than those referenced in FIG. 2.

The embodiment 200 of the controller 130 includes a SOC error determination module 210, a gain scheduling module 220, an alternator power demand determination module 230, a power to voltage conversion module 240, and alternator voltage limiting module 250, and an alternator voltage control module 260. Other arrangements that functionally execute the operations of the controller 130 are contemplated in the present application.

The SOC error determination module 210 may be structured to receive and interpret the battery SOC input 204 and a battery SOC target 208 to determine a SOC error 212, or SOC deviation. In certain embodiments, the battery SOC target 208 may be retrieved from a look-up table programmed in the controller 130 or in a memory external to and accessible by the controller 130. The SOC error determination module 210 may include a closed loop controller to determine the SOC error 212 between the dynamically determined battery SOC target 208 and the battery SOC input 204. The closed loop controller includes gain scheduling and may include other features to increase response rate as desired. In certain other embodiments, the SOC error 212 may be based on an open loop estimation. In one embodiment, the SOC error determination module 210 may implement a proportional controller to determine the SOC error 212. It should be appreciated that other embodiments may utilize other types of controllers such as a proportional integral (PI) controller, a proportional derivative (PD) controller, a proportional integral derivative (PID) controller, and/or a fuzzy logic controller, to name a few examples. In certain embodiments, the SOC error 212 may be determined at least in part from the $SO_x$ sensor 132 referenced in FIG. 1.

The gain scheduling module 220 may be structured to receive and interpret the engine load input 202 and the SOC error 212 determined at the SOC error determination module 210. The gain scheduling module 220 may be further structured to determine a proportional gain 222 and a proportional gain 224. In one embodiment, the gain scheduling module 220 may implement a proportional controller to determine the proportional gain 222 and/or the proportional gain 224. It should be appreciated that other embodiments may utilize other types of controllers such as a proportional integral (PI) controller, a proportional derivative (PD) controller, a proportional integral derivative (PID) controller, and/or a fuzzy logic controller, to name a few examples. In certain embodiments, the proportional gain 222 and/or the proportional gain 224 may be further determined based on an engine operating condition other than the engine load input 202. In certain embodiments, the gain scheduling module 220 may apply a filter (e.g., a low-pass filter) and/or a rate limiter to smooth the proportional gain 222 and/or the proportional gain 224.

The alternator power demand determination module 230 may be structured receive and interpret the SOC error 212 determined at the SOC error determination module 210 and the proportional gain 222 determined at the gain scheduling module 220. The alternator power demand determination module 230 may be further structured to determine an alternator power demand 232 based on the SOC error 212 and the proportional gain 222.

In certain embodiments, the alternator power demand determination module 230 may apply a power hysteresis to adjust the alternator power demand 232. In certain embodiments, the power hysteresis may include an alternator power on condition, an alternator power off condition, a power deadband upper limit, and/or a power deadband lower limit. Additionally or alternatively, the alternator power demand determination module 230 may apply power limits, rate limiters, and/or low-pass filters to smooth the alternator power demand 232. In certain embodiments, the power limits may include upper and lower alternator power limits and/or a percentage of power limit. In certain embodiments, the alternator power demand determination module 230 may be further structured to minimize the SOC error 212 and further determine the alternator power demand 232 based on the minimized SOC error.

The power to voltage conversion module 240 may be structured to receive and interpret the alternator power demand 232 from the alternator power demand determination module 230. The power to voltage conversion module 240 may be further structured to convert the alternator power demand 232 to an alternator voltage demand 242. The alternator power demand 232 may be converted to the alternator voltage demand 242 using a look-up table programmed in the controller 130 or in a memory external to and accessible by the controller 130. In certain embodiments, the look-up table may compare an open circuit voltage with the battery SOC input 204 to determine the alternator voltage demand 242. In certain embodiments, the alternator power demand 232 may be adjusted using a linear feedback control system, such as a proportional controller. In certain embodiments, the proportional controller may use a constant proportional gain. It should be appreciated that other embodiments may utilize other types of controllers such as a proportional integral (PI) controller, a proportional derivative (PD) controller, a proportional integral derivative (PID) controller, and/or a fuzzy logic controller, to name a few examples. In other embodiments, efficiency of the alternator may also be considered to convert power to equivalent voltage.

The alternator voltage limiting module 250 may be structured to receive and interpret the alternator voltage demand 242 from the power to voltage conversion module 240 to determine a limited alternator voltage demand 252. The alternator voltage limiting module 250 may apply protection limits and/or saturation limits to the alternator voltage command. In certain embodiments, the protection limits may include limiting the alternator voltage command to a lower limit, a previous alternator voltage command, or a constant alternator voltage command. In certain embodiments, the saturation limits may include upper and lower saturation limits that may be based on calibrated saturation limits and/or a battery condition, such as a battery temperature, for example. It is contemplated that under certain conditions, the alternator voltage demand 242 may not be limited by the alternator voltage limiting module 250, whereby the limited alternator voltage demand 252 is equal to the alternator voltage demand 242.

The alternator voltage control module 260 may be structured to receive and interpret the proportional gain 224 and/or the limited alternator voltage demand 252. The alternator voltage control module 260 may be further structured to provide an alternator voltage command 262 to an alternator, such as the alternator 114 of the system 100 referenced in FIG. 1.

The alternator voltage command 262 may cause the alternator 114 to either charge a battery, such as the energy storage device 118, or power one or more accessories of the system 100, such as the accessory drive system 112. Under a high engine load condition, such as an engine load being greater than a high engine load threshold, the alternator voltage command 262 may regulate the alternator 114 voltage to be less than the battery SOC input 204 (i.e., the current battery voltage) to enable the energy storage device 118 to power the accessory drive system 112. For example, in one non-limiting embodiment where the energy storage device 118 is a 12-volt battery having a current battery voltage of 12.1 volts, the alternator voltage command 262 may regulate the alternator 114 voltage to be equal to 11 volts, causing the energy storage device 118 to power the accessory drive system 112. It should be appreciated that the alternator voltage command 262 may be any other voltage sufficient to cause the energy storage device 118 to power the accessory drive system 112.

Under a low engine load condition or a medium engine load condition, such as an engine load being equal to or less than the high engine load threshold, the alternator voltage command 262 may regulate the alternator 114 voltage to be greater than the battery SOC input 204 to enable the alternator 114 to charge the energy storage device 118. Under certain conditions, to enable the alternator 114 to charge the energy storage device 118, the alternator voltage command 262 may be greater than the battery SOC input 204. For example, in one non-limiting embodiment where the energy storage device 118 is a 12-volt battery having a current battery voltage of 12.1 volts, the alternator voltage command 262 may regulate the alternator 114 voltage to be equal to 13 volts, causing the alternator 114 to charge the energy storage device 118. It should be appreciated that the alternator voltage command 262 may be any other voltage sufficient to cause the alternator 114 to charge the energy storage device 118.

In certain embodiments, the alternator voltage command 262 may be greater than the battery SOC input 204 plus an internal resistance of the electrical energy storage device 118.

Figure 3:
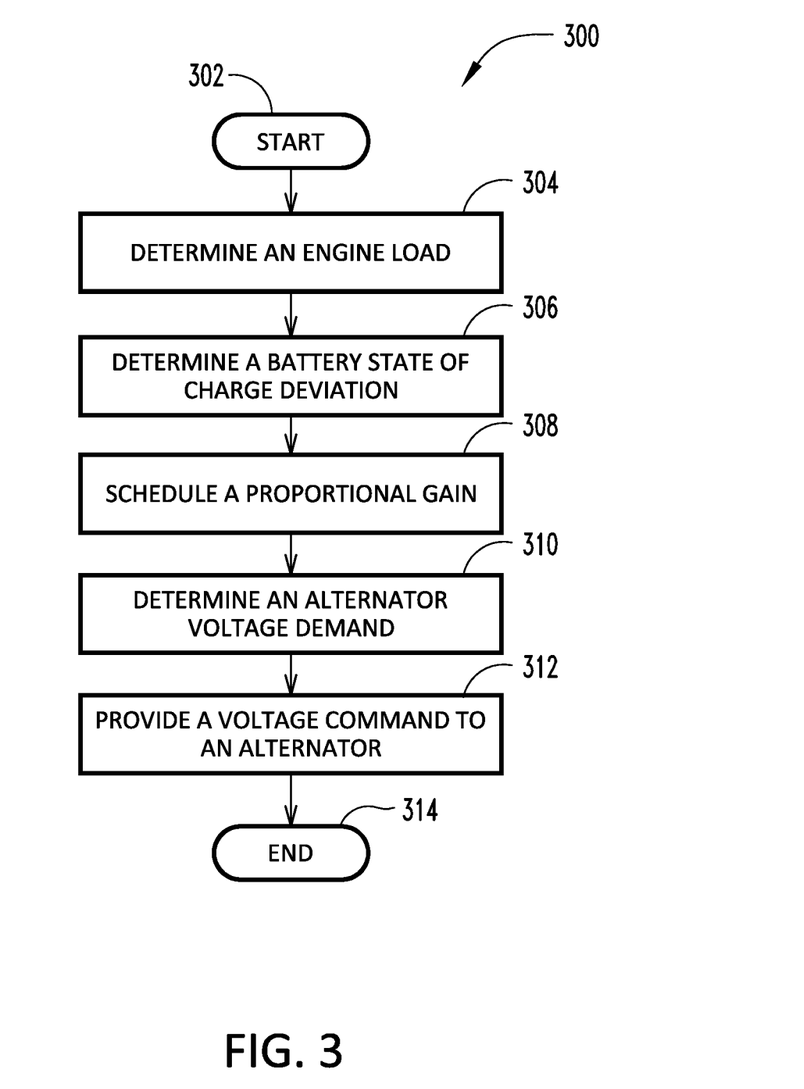
FIG. 3 is a flow diagram of an example procedure for providing an alternator voltage command to the alternator of FIG. 1.
Figure 4:
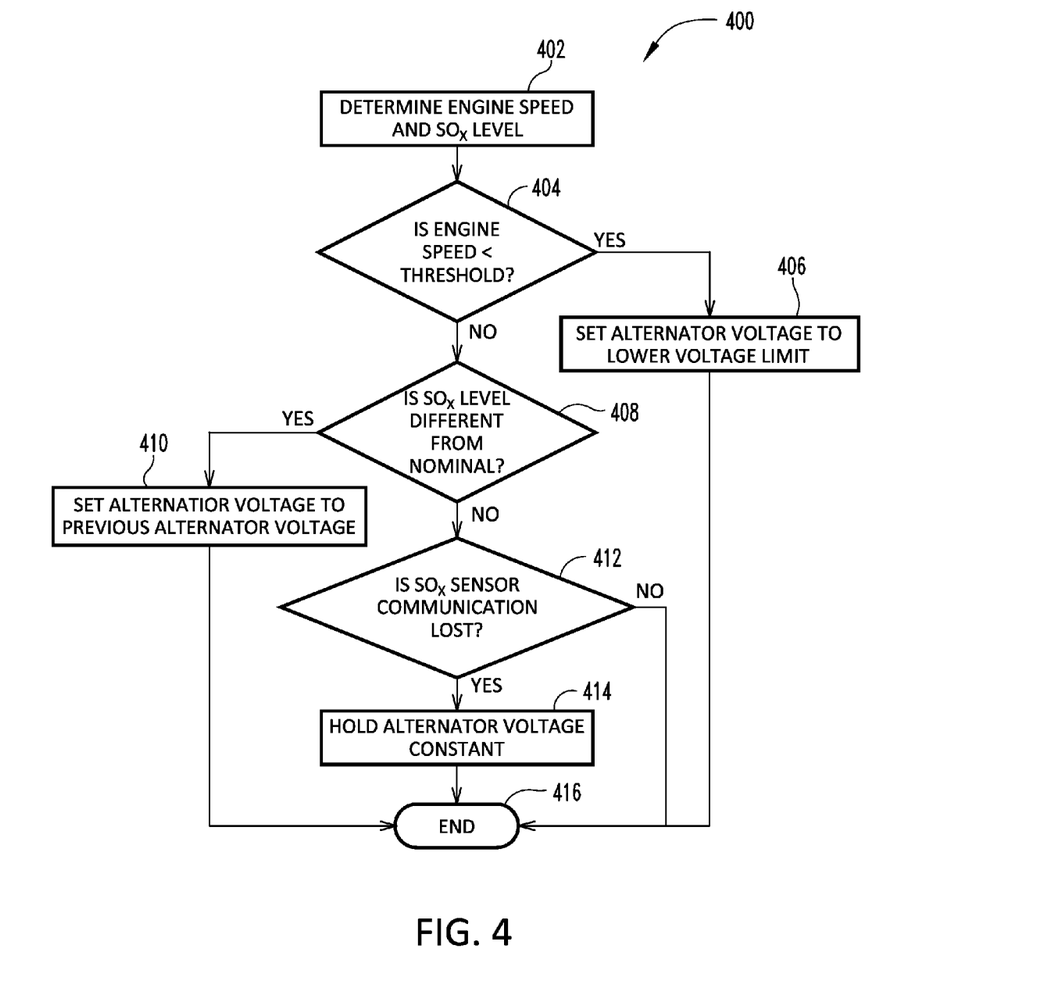
FIG. 4 is a flow diagram of an example procedure for applying a protection condition to the alternator voltage command of FIG. 3.

The schematic flow diagrams referenced in FIGS. 3-4 and related descriptions which follow provide illustrative embodiments of performing example procedures for providing a voltage command to an alternator, such as the alternator 114 referenced in FIG. 1. Operations illustrated are understood to be exemplary only, and operations may be combined or divided, and added or removed, as well as re-ordered in whole or part, unless stated explicitly to the contrary herein.

With reference to FIG. 3, there is illustrated a flow diagram of a procedure 300 for providing an alternator voltage command to the alternator 114. The procedure 300 may be put into operation by programming the controller 130 for use in, for example, system 100. The procedure 300 begins at operation 302, in which a control routine for providing various inputs to the controller 130 to determine the alternator voltage demand is started. Operation 302 may begin by interpreting a key-on event, completion of a cycle, restarting procedure 300, and/or by initiation by the operator or a technician.

Procedure 300 continues from operation 302 to operation 304 to determine an engine load. In one embodiment, the engine load may include a net brake torque. In other embodiments, the engine load may additionally or alternatively include an intake manifold pressure, an exhaust manifold pressure, an external load condition, and/or a parasitic load condition. Any value understood in the art as an engine load value is contemplated in the present application.

From operation 304, procedure 300 continues to operation 306 to determine a SOC deviation, or error value, of a battery, such as the electrical energy storage device 118 referenced in FIG. 1. The SOC deviation is the difference between a present SOC of the electrical energy storage device 118 and a target SOC for the electrical energy storage device 118. In certain embodiments, the technique for determining the SOC deviation may include adjusting the SOC deviation based on a present vehicle speed, a temperature of the electrical energy storage device 118, a state-of-health (SOH) of the electrical energy storage device 118, a machine power demand, and/or an integrated SOC deviation over time. The operation to adjust the SOC deviation may include either an adjustment of the target SOC, and/or an adjustment directly of the SOC deviation downstream of determining a difference between the present SOC of the electrical energy storage device 118 and the target SOC of the electrical energy storage device 118.

From operation 306, procedure 300 continues to operation 308 to schedule a proportional gain based on the engine load determined at operation 304 and the SOC deviation determined at operation 306. In one embodiment, a closed loop controller may be used in the gain scheduling to minimize the SOC deviation. The closed loop controller may be a proportional controller, a proportional integral (PI) controller, a proportional derivative (PD) controller, a proportional integral derivative (PID) controller, and/or a fuzzy logic controller. In certain embodiments, the proportional gain may be further scheduled based on an engine operating condition other than the engine load determined at operation 304.

Procedure 300 continues from operation 308 to operation 310 to determine an alternator voltage demand. In certain embodiments, the alternator voltage demand may be adjusted by applying a filter (e.g., a low-pass filter), a limiter (e.g., a rate limiter, a power limiter, etc.), and/or a hysteresis (e.g., an alternator power hysteresis) to the proportional gain determined at operation 308. In certain embodiments, the alternator voltage demand may be additionally or alternatively adjusted based on a protection condition discussed in further detail in FIG. 4 and/or a power saturation limit of the alternator 114. In certain embodiments, the power saturation limit may include an upper and/or lower saturation limit, each of which may be based on calibrated saturation limits and/or a condition of the electrical energy storage device 118, such as the temperature of the electrical energy storage device 118, for example.

Procedure 300 continues from operation 310 to operation 312 to provide a voltage command to the alternator 114 to regulate the voltage level of the alternator 114. The alternator voltage command may be a low voltage command under certain conditions, such as when the engine load determined at operation 304 is greater than a high threshold value, for example, causing the electrical energy storage device 118 to power the accessory drive system 112. The alternator voltage command may be a high voltage command under certain conditions, such as when the engine load determined at operation 304 is equal to or less than the high threshold value, for example, causing the alternator 114 to charge the electrical energy storage device 118. The high and/or low voltage commands may be based on a current voltage level of the electrical energy storage device 118.

In one non-limiting example embodiment where the energy storage device 118 is a 12-volt battery having a current battery voltage of 12.1 volts, the low voltage command may be in the range of 10-11 volts, causing the electrical energy storage device 118 to power the accessory drive system 112. In another non-limiting example embodiment where the energy storage device 118 is a 12-volt battery having a current battery voltage of 12.1 volts, the high voltage command may be in the range of 13-14 volts, causing the alternator 114 to charge the energy storage device 118. It should be appreciated that the high voltage command and the low voltage command may be any other voltage sufficient to cause the alternator 114 to charge the energy storage device 118 or cause the energy storage device 118 to power the accessory drive system 112, respectively. In certain embodiments, the high and/or low voltage commands may be further based on an internal resistance of the electrical energy storage device 118 to effectively charge or discharge the electrical energy storage device 118.

With reference to FIG. 4, there is illustrated a flow diagram of a procedure 400 for applying the protection condition which may be applied to adjust the alternator voltage demand as discussed as a portion of operation 310 of FIG. 3 in determining the alternator voltage demand. Procedure 400 begins at operation 402 where each of an engine speed and an $SO_x$ level are determined. Procedure 400 continues to conditional 404 to determine whether the engine speed is less than an engine speed threshold. If it is determined that the engine speed is less than the engine speed threshold, procedure 400 continues to operation 406 to set the alternator voltage demand to a lower voltage limit before ending the present iteration of procedure 400 at operation 416. If it is determined that the engine speed is not less than the engine speed threshold, procedure 400 continues to conditional 408.

At conditional 408, it is determined whether the $SO_x$ level is different from a nominal $SO_x$ level. If it is determined that the $SO_x$ level is different from the nominal $SO_x$ level, procedure 400 continues to operation 410 to set the alternator voltage demand to a previous alternator voltage before ending the present iteration of procedure 400 at operation 416. If it is determined that the $SO_x$ level is not different from the nominal $SO_x$ level, procedure 400 continues to conditional 412 to determine whether communication with the $SO_x$ sensor is lost. If it is determined that communication with the $SO_x$ sensor is lost, procedure 400 continues to operation 414 to hold the alternator voltage demand at a constant voltage before ending the present iteration of procedure 400 at operation 416. If it is determined that communication with the $SO_x$ sensor is not lost, procedure 400 continues to operation 416, ending the present iteration of procedure 400.

Figure 5:
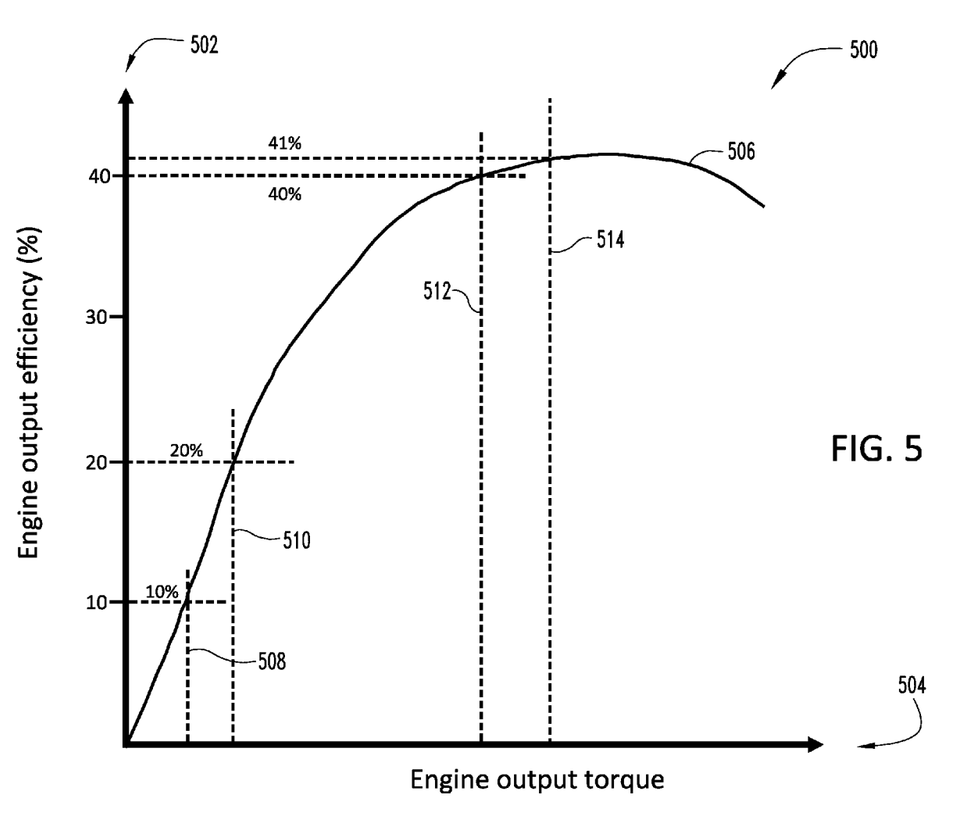
FIG. 5 is a graph of an example engine output efficiency for an output torque of the engine of FIG. 1 based on a usage of the alternator of FIG. 1.

Referencing FIG. 5, a graph 500 illustrates an example engine output efficiency for an output torque of an engine, such as the engine 104 referenced in FIG. 1, based on a usage of an active alternator, or smart alternator, such as the alternator 114 referenced in FIG. 1. The graph 500 includes an engine output efficiency as a percentage along a y-axis 502 and an engine output torque along an x-axis 504. The graph 500 further includes results 506 of an engine load with and without an alternator load at varying engine output torques at a fixed engine speed. The graph additionally includes result references 508, 510, 512, and 514 at various efficiency levels, 10%, 20%, 40%, and 41%, respectively. The first result reference 508 and the third result reference 512 each represent the engine 104 without an active alternator load, while the second result reference 510 and the fourth result reference 514 each represent the engine 104 with an active alternator load.

The graph 500 indicates that by actively selecting to only use the alternator 114 during the low engine load/low engine efficiency regions, the net cycle average engine efficiency increased to 30%, an increase from 27.75% using a passive alternator (i.e., used during low and high engine load and efficiency regions) under the same conditions. Certain conditions, such as the $SO_x$ level, dynamically changing loads, etc., may limit the cycle average engine efficiency results achieved using the alternator 114 as illustrated in FIG. 5.

One aspect of the present application includes a method, comprising: determining an engine load of an internal combustion engine mechanically coupled to an alternator, wherein a battery is electrically coupled to the alternator; determining a state of charge (SOC) deviation for the battery based on a target SOC of the battery and an actual SOC of the battery; scheduling a proportional gain in response to at least one of the engine load and the SOC deviation; and providing, with a controller, an alternator voltage command to the alternator based on the proportional gain.

Features of the aspect may include: scheduling the proportional gain further in response to at least one further engine operating condition, the at least one further engine operating condition comprising an engine operating condition that is not the engine load; determining an alternator power demand based on at least one of the proportional gain and the SOC deviation; determining an alternator voltage demand based on a conversion of the alternator power demand; and further providing the alternator voltage command to the alternator based on the alternator voltage demand; determining the alternator power demand by applying a filter to the proportional gain; wherein the determining the alternator power demand further comprises minimizing a SOC deviation; adjusting the alternator power demand by applying a hysteresis, smoothing the alternator power demand, and applying a power limiter; and further determining the alternator voltage demand in response to the adjusted alternator power demand; determining a limited alternator voltage demand based on at least one of a protection condition and a saturation limit, and further determining the alternator voltage command in response to the limited alternator voltage demand; wherein the protection condition includes at least one condition selected from the conditions consisting of a current engine speed being less than a threshold, a SOC amount difference from a nominal SOC amount, and a SOC sensor signal being lost; wherein the providing the alternator voltage command to the alternator further includes providing a low voltage command in response to the engine load being above a high threshold value, wherein the low voltage command causes the battery to power an accessory system; wherein the providing the alternator voltage command to the alternator further includes providing a high voltage command in response to the engine load being equal to or below a high threshold value, wherein the high voltage command causes the alternator to charge the battery.

Another aspect of the present application includes a system, comprising: a start-stop vehicle including an internal combustion engine mechanically coupled to an alternator, an electrical energy storage device electrically coupled to the alternator, and a controller in electrical communication with the internal combustion engine, the alternator, the electrical energy storage device, and one or more vehicle sensors operable to provide signals indicating conditions of the start-stop vehicle, wherein the controller is structured to: interpret an engine load of the internal combustion engine; determine a state of charge (SOC) error of the battery based on a target SOC of the battery and an actual SOC of the battery; determine a proportional gain as a function of at least one of the engine load and the SOC error; and provide an alternator voltage command to the alternator based on the proportional gain.

Features of the aspect may include: wherein the proportional gain is further determined in response to at least one further engine operating condition, the at least one further engine operating condition comprising an engine operating condition that is not the engine load; wherein the engine load comprises a net brake torque; operating a closed loop controller to determine at least one of the SOC error and the proportional gain; wherein the controller is further structured to: adjust the SOC error based on at least one of a present vehicle speed, a temperature of the battery, a state of health (SOH) of the battery, a start-stop vehicle power demand, and an integrated SOC deviation of the battery over time, wherein at least one of the proportional gain and the alternator voltage command is further based on the adjusted SOC error; wherein the alternator voltage command comprises a high voltage command to enable the alternator to charge the battery when the engine load being equal to or less than a high threshold value; wherein the alternator voltage command comprises a low voltage command to enable the battery to power accessories in response to the engine load being greater than the high threshold value.

Yet another aspect of the present application includes an apparatus, comprising: an electronic controller in operative communication with a plurality of sensors operable to provide signals indicating conditions of a system, the system including an engine, an alternator operationally coupled to the engine, and a battery electrically coupled to the alternator, wherein the electronic controller includes: a state of charge (SOC) error determination module structured to determine a SOC error of the battery; a gain scheduling module structured to determine a proportional gain in response to an engine load and the SOC error; and an alternator voltage control module structured to provide the alternator with an alternator voltage command based on the proportional gain.

Features of the aspect may include: an alternator power demand determination module structured to determine an alternator power demand based on the proportional gain and the SOC error; a power to voltage conversion module structured to convert the alternator power demand to an alternator voltage demand; and an alternator voltage limiting module structured to limit the alternator voltage demand, wherein the alternator voltage control module is further structured to provide the alternator voltage command further based on the limited alternator voltage; wherein the alternator voltage demand is limited based on at least one of a speed of the engine, a SOC of the battery, a saturation limit of the battery, and a temperature of the battery; wherein the alternator voltage command causes the alternator to either charge the battery or power one or more accessories; wherein the gain scheduling module is further structured to determine the proportional gain further in response to at least one further engine operating condition, the at least one further engine operating condition comprising an engine operating condition that is not the engine load; wherein the alternator voltage command comprises a low voltage command when the engine load is high, the low voltage command being a voltage less than a current battery voltage to enable the battery to power an accessory system; wherein the alternator voltage command comprises a high voltage command when the engine load is less than high, the high voltage command being a voltage greater than a voltage of the battery to enable the alternator to charge the battery.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
    determining an engine load of an internal combustion engine mechanically coupled to an alternator, wherein a battery is electrically coupled to the alternator;
    determining a state of charge (SOC) deviation for the battery based on a target SOC of the battery and an actual SOC of the battery;
    scheduling a proportional gain in response to the determined engine load and the determined SOC deviation;
    providing, with a controller, an alternator voltage command to the alternator based on the scheduled proportional gain;
    determining an alternator power demand based on at least one of the scheduled proportional gain and the determined SOC deviation;
    determining an alternator voltage demand based on a conversion of the alternator power demand;
    providing the alternator voltage command to the alternator based on the determined alternator voltage demand; and
    at least one of:
        adjusting the alternator power demand by applying a hysteresis, smoothing the alternator power demand, and applying a power limiter and further determining the alternator voltage demand in response to the adjusted alternator power demand; and
        determining a limited alternator voltage demand based on at least one of a protection condition and a saturation limit and further determining the alternator voltage command in response to the limited alternator voltage demand.

2. The method of claim 1, further comprising:
    determining the alternator power demand by applying a filter to the proportional gain.

3. The method of claim 1, wherein the determining the alternator power demand further comprises minimizing a SOC deviation.

4. The method of claim 1, wherein the protection condition includes at least one condition selected from the conditions consisting of a current engine speed being less than a threshold, a SOC amount difference from a nominal SOC amount, and a SOC sensor signal being lost.

5. The method of claim 1, wherein the providing the alternator voltage command to the alternator further includes providing a low voltage command in response to the engine load being above a high threshold value, wherein the low voltage command causes the battery to power an accessory system.

6. The method of claim 5, wherein the providing the alternator voltage command to the alternator further includes providing a high voltage command in response to the engine load being equal to or below a high threshold value, wherein the high voltage command causes the alternator to charge the battery.

7. A system, comprising:
a start-stop vehicle including an internal combustion engine mechanically coupled to an alternator, an electrical energy storage device electrically coupled to the alternator, and a controller in electrical communication with the internal combustion engine, the alternator, the electrical energy storage device, and one or more vehicle sensors operable to provide signals indicating conditions of the start-stop vehicle,
wherein the controller is structured to:
interpret an engine load of the internal combustion engine;
determine a state of charge (SOC) error of the battery based on a target SOC of the battery and an actual SOC of the battery;
determine a proportional gain as a function of the interpreted engine load and the determined SOC error;
provide an alternator voltage command to the alternator based on the determined proportional gain;
determine an alternator power demand based on at least one of the scheduled proportional gain and the determined SOC deviation;
determine an alternator voltage demand based on a conversion of the alternator power demand;
provide the alternator voltage command to the alternator based on the determined alternator voltage demand; and
at least one of:
adjust the alternator power demand by applying a hysteresis, smoothing the alternator power demand, and applying a power limiter and further determine the alternator voltage demand in response to the adjusted alternator power demand; and
determine a limited alternator voltage demand based on at least one of a protection condition and a saturation limit and further determine the alternator voltage command in response to the limited alternator voltage demand.

8. The system of claim 7, wherein the engine load comprises a net brake torque.

9. The system of claim 7, further comprising operating a closed loop controller to determine at least one of the SOC error and the proportional gain.

10. The system of claim 7, wherein the controller is further structured to:
adjust the SOC error based on at least one of a present vehicle speed, a temperature of the battery, a state of health (SOH) of the battery, a start-stop vehicle power demand, and an integrated SOC deviation of the battery over time,
wherein at least one of the proportional gain and the alternator voltage command is further based on the adjusted SOC error.

11. The system of claim 7, wherein the alternator voltage command comprises a high voltage command to enable the alternator to charge the battery when the engine load being equal to or less than a high threshold value.

12. The system of claim 11, wherein the alternator voltage command comprises a low voltage command to enable the battery to power accessories in response to the engine load being greater than the high threshold value.

13. An apparatus, comprising:
an electronic controller in operative communication with a plurality of sensors operable to provide signals indicating conditions of a system, the system including an engine, an alternator operationally coupled to the engine, and a battery electrically coupled to the alternator, wherein the electronic controller includes:
a state of charge (SOC) error determination module structured to determine a SOC error of the battery;
a gain scheduling module structured to determine a proportional gain in response to an engine load input and the determined SOC error; and
an alternator voltage control module structured to provide the alternator with an alternator voltage command based on the determined proportional gain;
an alternator power demand determination module structured to determine an alternator power demand based on the determined proportional gain and the determined SOC error;
a power to voltage conversion module structured to convert the alternator power demand to an alternator voltage demand; and
an alternator voltage limiting module structured to limit the alternator voltage demand, wherein the alternator voltage control module is further structured to provide the alternator voltage command further based on the limited alternator voltage.

14. The apparatus of claim 13, wherein the alternator voltage demand is limited based on at least one of a speed of the engine, a SOC of the battery, a saturation limit of the battery, and a temperature of the battery.

15. The apparatus of claim 13, wherein the alternator voltage command causes the alternator to either charge the battery or power one or more accessories.

16. The apparatus of claim 13, wherein the alternator voltage command comprises a low voltage command when the engine load is high, the low voltage command being a voltage less than a current battery voltage to enable the battery to power an accessory system.

17. The apparatus of claim 13, wherein the alternator voltage command comprises a high voltage command when the engine load is less than high, the high voltage command being a voltage greater than a voltage of the battery to enable the alternator to charge the battery.

* * * * *